United States Patent
Miebach (10) Patent No.: US 12,409,500 B2
(45) Date of Patent: Sep. 9, 2025

(54) CYLINDRICAL HEAD BORING TOOL, IN PARTICULAR A FORSTNER BIT

(71) Applicant: Colt Technologies GmbH, Lindlar (DE)

(72) Inventor: Jürgen Miebach, Lindlar (DE)

(73) Assignee: COLT TECHNOLOGIES GMBH, Lindlar (DE)

( * ) Notice: Subject to any disclaimer, the term of this patent is extended or adjusted under 35 U.S.C. 154(b) by 315 days.

(21) Appl. No.: 17/773,879

(22) PCT Filed: Nov. 4, 2020

(86) PCT No.: PCT/EP2020/080891
§ 371 (c)(1),
(2) Date: May 3, 2022

(87) PCT Pub. No.: WO2021/089587
PCT Pub. Date: May 14, 2021

(65) Prior Publication Data
US 2022/0371106 A1    Nov. 24, 2022

(30) Foreign Application Priority Data
Nov. 4, 2019 (NL) ..................... 2024154

(51) Int. Cl.
*B27G 15/00* (2006.01)
*B23B 51/04* (2006.01)
(52) U.S. Cl.
CPC .......... *B23B 51/0413* (2013.01); *B27G 15/00* (2013.01); *B23B 2226/61* (2013.01)

(58) Field of Classification Search
CPC ............ B23B 51/0413; B23B 2251/28; B23B 2251/74; B23B 51/04; B27G 15/00
See application file for complete search history.

(56) References Cited

U.S. PATENT DOCUMENTS

| | | | |
|---|---|---|---|
| 194,221 A | | 8/1877 | Clarkson |
| 3,548,687 A | * | 12/1970 | Holloway ............... B23B 51/04 408/206 |
| 6,123,490 A | * | 9/2000 | Underhill ............ B23B 51/0466 408/206 |
| 2002/0141838 A1 | * | 10/2002 | Thomas ................. B27G 15/00 408/214 |

(Continued)

FOREIGN PATENT DOCUMENTS

| | | | |
|---|---|---|---|
| DE | 0870561 A1 * | 10/1998 | ......... B23B 51/0413 |
| FR | 2429007 A1 | 1/1980 | |
| WO | 97/00749 A1 | 1/1997 | |

OTHER PUBLICATIONS

English translation of EP0870561 (Year: 1998).*
Int'l Search Report issued Feb. 9, 2021 in Int'l Application No. PCT/EP2020/080891.

*Primary Examiner* — Alan Snyder
(74) *Attorney, Agent, or Firm* — Panitch Schwarze Belisario & Nadel LLP (57) ABSTRACT

A cylindrical drill bit includes at least one set of circumferential cutting edges positioned at a circumference of the drill bit; the circumference is centred to a longitudinal rotational axis; each set of circumferential cutting edges includes at least two circumferential cutting edges; and the at least two circumferential cutting edges have a mutually different radial distance from the longitudinal rotational axis.

22 Claims, 5 Drawing Sheets

(56) References Cited

U.S. PATENT DOCUMENTS

| | | | |
|---|---|---|---|
| 2007/0172325 A1* | 7/2007 | Ebert | B23B 51/0426 408/227 |
| 2009/0087273 A1* | 4/2009 | Allen | B23B 51/0473 408/208 |
| 2009/0208302 A1* | 8/2009 | Durfee | B27G 15/00 408/208 |
| 2010/0003094 A1* | 1/2010 | Durfee | B27G 15/00 408/231 |
| 2012/0093599 A1 | 4/2012 | Evatt et al. | |
| 2017/0312831 A1* | 11/2017 | Little | B23B 31/1075 |

* cited by examiner

CYLINDRICAL HEAD BORING TOOL, IN PARTICULAR A FORSTNER BIT

CROSS-REFERENCE TO RELATED APPLICATIONS

This application is a Section 371 of International Application No. PCT/EP2020/080891, filed Nov. 4, 2020, which was published in the English language on May 14, 2021 under International Publication No. WO 2021/089587 A1, which claims priority under 35 U.S.C. § 119 to Dutch Patent Application No. 2024154, filed on Apr. 11, 2019 the disclosures of all of which are incorporated herein by reference in their entireties.

FIELD OF THE INVENTION

The invention relates to a cylindrical head boring tool, in particular a Forstner bit.

BACKGROUND OF THE INVENTION

Cylindrical head boring tools of cylindrical drill bit have been on the market for a long time. Particularly known tools or bits are Forstner/Foerstner bits. These bits often have a centering tip or centering point, also referred to as a mandrel, one or two substantially radial main cutting edges extending from the mandrel, and peripheral cutting edges. These tools or bits are for instance described in the following publications: U.S. Pat. Nos. 5,695,304, 5,975,814, 6,045,302, 6,394,714, 6,644,899 and 7,648,316.

SUMMARY OF THE INVENTION

May improvements have been presented, as illustrated above. The current bits or tools leave room for improvement. For instance, stable run while cutting can be improved. Furthermore, or alternatively, cutting in plastic can be improved.

Hence, it is an aspect of the invention to provide an alternative tool or bit, which preferably further at least partly obviates one or more of above-described drawbacks. There is provided a cylindrical drill bit comprising at least one set of circumferential cutting edges positioned at a circumference of the drill bit;
   wherein the circumference is centered to a longitudinal rotational axis;
   wherein each set of circumferential cutting edges comprises at least two circumferential cutting edges; and
   wherein the at least two circumferential cutting edges have a mutually different radial distance from the longitudinal rotational axis.

The cylindrical drill bit is typically used for drilling larger holes in a material, such as wood, plastic, metal or the like. The holes to be drilled may be through holes, blind hole or any other type of circular hole. As the holes to be drilled are typically wide, the cylindrical drill bit comprises circumferential cutting edges for defining the circumference of the hole. The circumference of the drilled hole typically snugly or tightly fits the circumference of the cylindrical drill. The cylindrical drill further comprises a shaft or shank for driving the cylindrical drill bit. The cylindrical drill bit is typically rotationally driven at a relatively high rpm, while a longitudinal force is applied to the cylindrical drill for relatively slowly driving the drill into the material. The circumference of the cylindrical drill and typically also the shaft of the cylindrical drill are centered around a longitudinal rotational axis. The centering provides the advantage of lowering the vibration and improving the stability of the cylindrical drill.

The cylindrical drill bit has at least one set of circumferential cutting edges comprising at least two circumferential cutting edges. Typically, the cylindrical drill bit comprises two sets of circumferential cutting edges, but the cylindrical drill bit may comprise more than two sets of circumferential cutting edges. A set of circumferential cutting edges may comprise more than two circumferential cutting edges, such as three, four or more.

According to the invention, the at least two circumferential cutting edges have a mutually different radial distance from the longitudinal rotational axis. As the at least two circumferential cutting edges rotate around the longitudinal axis, and thus follow each other, one circumferential cutting edge may be seen as the leading circumferential cutting edge relative to the other circumferential cutting edge and the other circumferential cutting edge may be seen as the trailing circumferential cutting edge relative to the leading circumferential cutting edge. During operation, by arranging a trailing circumferential cutting edge at a radial distance different from a leading circumferential cutting edge it is prevented that the trailing circumferential cutting edge follows the groove in the object drilled in, cut or created by the leading circumferential cutting edge. It is an insight of the inventor that the trailing circumferential cutting edge, when not placed at a different radial distance, typically causes more friction with the groove wall causing heat and vibration in the drill head and the object to be drilled or cut. The invention has thus the technical effect of reducing heat generation and/or vibration in the drill head and the object during operation. Furthermore, a larger part of the surface of the trailing circumferential cutting edge is used during drilling, having the effect of distributing wear over a larger surface, more evenly and/or increasing the speed with which material is cut away. The distribution of wear has the effect of prolonging the lifetime of the drill bit. Furthermore, due to the reduced friction, the cylindrical drill bit will heat up less providing the advantage of less wear of the cylindrical drill bit. Furthermore, due to the reduced friction, it is less likely the material to be drilled is burned and/or heated to a temperature that the material oxidizes or deforms through melting.

In an embodiment of the invention, the radial distance increases or decreases for subsequent circumferential cutting edges, preferably linear, quadratic, square root, logarithmic or exponential. The predictable, orderly, steady and/or regular increase or decrease of the radial distance allows ease of design. In an embodiment of the invention, the radial distance increases with the root square or decreases quadratic to evenly compensate for change in radial velocity of the circumferential cutting edges. This embodiment allows each circumferential cutting edge to receive the same amount of energy due to the impact with the material cut away.

In an embodiment of the invention, the cylindrical drill bit comprises at least two substantially radial, main cutting edges radially extending from the longitudinal rotational axis, wherein each set of circumferential cutting edges is arranged between two subsequent main cutting edges and at radial ends of the main cutting edges. The main cutting edges typically chip or cut away most of the material. The main cutting edges have the disadvantage that the material shatters and/or splinters due to the way the main cutting edge is arranged. The circumferential cutting edges typically are positioned and arranged for minimizing the shattering and/or splintering of the material, but have the disadvantage of allowing not as much material to be transported away from the area cut. In an embodiment, the circumferential cutting edges extend beyond the two main cutting edges in a longitudinal direction away from the shaft.

This allows the material first to be cut with a circular pattern by the circumferential cutting edges, where after the main cutting edges cut and/or chip away the inside. This has the effect that the hole in the material is having a clean side wall minimizing the shattering and/or splintering of the side wall of the hole in the material, while the hole can still be drilled with speed as the main cutting edges efficiently cut and/or chip away the larger part of the material.

In an embodiment of the invention, the at least two circumferential cutting edges each have a width and wherein the change in the radial distance does not exceed any of the widths. This embodiment provides the advantage that the at least two circumferential cutting edges after cutting provide a single groove without any material left in the groove, such as very thin layers or walls of material.

In an embodiment of the invention, the at least two circumferential cutting edges each have a frontal surface facing the material to be cut away, wherein the at least two circumferential cutting edges are arranged at such different radial distances that during operation, the at least two circumferential cutting edges form one groove in the material to be cut away, wherein the groove is wider than any of the widths of the at least two circumferential cutting edges. This embodiment provides the advantage that the at least two circumferential cutting edges after cutting provide a single groove without any material left in the groove, such as very thin layers or walls of material. In a typical embodiment, the two circumferential cutting edges have substantially overlapping frontal, leading or longitudinal surfaces seen from a rotational perspective or in a rotational direction.

In an embodiment of the invention, the cylindrical drill bit comprises two of said sets of circumferential cutting edges, in particular each set of circumferential cutting edges comprising at least three circumferential cutting edges, more in particular each set of circumferential cutting edges comprising four circumferential cutting edges. Having two of said sets of circumferential cutting edges provides the advantage that the mass balance relative to the rotational axis can be maintained by design. In a typical embodiment, the sets of circumferential cutting edges are arranged point symmetric relative to the rotational axis. In a specific embodiment, the cylindrical drill bit comprises three sets of circumferential cutting edges, wherein the first set of circumferential cutting edges provides a first circumferential cutting edge, wherein the second set of circumferential cutting edges provides a second circumferential cutting edge, wherein the third set of circumferential cutting edges provides a third circumferential cutting edge, and wherein the first, second and third circumferential cutting edges are arranged at the same radial distance and radially shifted over ⅔ ir or 120° degrees.

In an embodiment of the invention, the cylindrical drill bit further comprises a space for positioning a central mandrel or centering tip from which space said main cutting edges extend. The mandrel provides the advantage allowing ease of positioning the cylindrical drill bit before the material is cut away by the circumferential cutting edges. Typically, a centering hole is drilled with a regular drill bit of limited diameter.

The centering hole advantageously guides the mandrel such that the larger hole drilled by the cylindrical drill bit is drilled at a predefined location. The combination of the mandrel and the set of circumferential cutting edges allows for accurately drilling a cylindrical hole having a smooth sidewall in a material.

In an embodiment of the invention, each main cutting edge connects to a chip space opening for in use leading chips away from said main cutting edges in longitudinal direction. As the main cutting edges cut away the larger part of the material drilled in, the space allows this material to be transported away from the area where the cutting takes places. Furthermore, the main cutting edges typically chip away much larger chunks of material compared to the circumferential cutting edges, the space typically has a size large enough to prevent chips of material clogging the chip space opening or even the area around the main cutting edges preventing the cylindrical drill bit to remain in contact with the material to be cut away. As less material is cut away and with smaller chunks or chips of material by the circumferential cutting edges, the material cut away by the circumferential cutting edges may advantageously also be transported away from the cutting site via the chip space opening.

In an embodiment of the invention, the cylindrical drill bit comprises a peripheral wall forming a cylinder of said cylindrical drill bit, in particular the form of segments of a hollow cylinder connecting a radial end of a main cutting edge and a chip space opening of a previous main cutting edge, and wherein longitudinal ends of said peripheral wall or peripheral wall segments are provided with said one or more circumferential cutting edges. The peripheral wall or peripheral wall segments allow the cylindrical drill to be guided by the side wall of the hole drilled, when the hole is deep enough. This guide provides an advantage during drilling as the cylindrical drill is easily guided in a straight line from the opening of the drilled hole. A cylindrical drill bit comprising the peripheral wall or peripheral wall segments in combination with a space for positioning a central mandrel advantageously allows the cylindrical drill bit to be positioned with high accuracy where after a straight cylindrical hole may be drilled.

In an embodiment of the invention, said circumferential cutting edges are spaced teeth having cutting edges providing the circumferential cutting edges. The teeth, specifically radially extending teeth, have an advantageous shape providing a strong base for the circumferential cutting edges.

In an embodiment of the invention, a side of the teeth directed to the rotational direction or the cutting direction of the main cutting edges provides a longitudinal cutting edge, wherein in particular said longitudinal cutting edge is at an inclined angle a with respect to a line parallel to the rotational axis, in particular an inclined angle a in the range of 5 to 15 degrees with respect to the line parallel to the rotational axis or longitudinal axis. The forward leaning longitudinal cutting edge substantially under the right angle a has the effect that the circumferential edge as a whole is forced deeper into the material during drilling. This allows the circumferential cutting edge to cut over a substantial longer length of the longitudinal cutting edge. By utilizing a substantial longer length of the longitudinal cutting edge, the wear is spread over this substantially longer length, thus prolonging the time the longitudinal cutting edge maintains sharpness, thus prolonging the lifetime of the cylindrical drill bit.

Furthermore, this force also causes the main cutting edges to be dragged into the material, having the effect of dragging the main cutting edges faster trough the material to be removed by the main cutting edges. This effect also works the other way around, as the main cutting edge chip away material, the longitudinal cutting edge is forced deeper into the material, causing the circumferential cutting edge to cut faster through the material.

In an embodiment of the invention, said radial distances of said circumferential cutting edges are set by setting a circumferential cutting-edge inner angle and a circumferential cutting-edge outer angle. This advantageously allows the centrifugal and centripetal forces acting upon the circumferential cutting edges during operation to be balanced.

According to another aspect of the invention, a cylindrical drill bit comprising at least two substantially radial, main cutting edges radially extending from a longitudinal rotational axis, and a set of circumferential cutting edges between two subsequent main cutting edges and at radial ends of the main cutting edges, each set of circumferential cutting edges comprising at least two subsequent circumferential cutting edges, and wherein subsequent circumferential cutting edges have a mutually different radial distance from the longitudinal rotational axis.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the adjectives/ordinal numbers first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and which may be provided with one or more brackets when more than one corresponding parts are to be indicated, and in which.

The drawings are not necessarily on scale.

DESCRIPTION OF PREFERRED EMBODIMENTS

Figure 1:
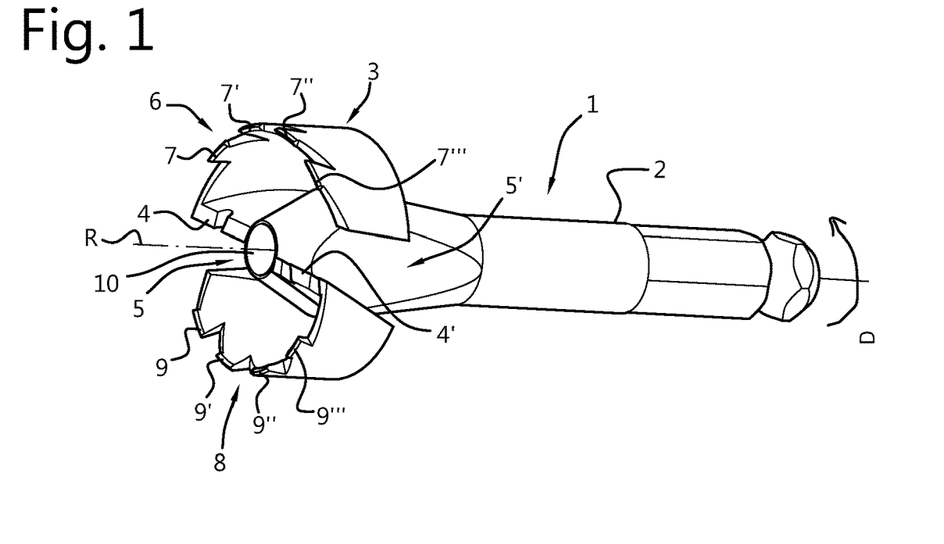
FIG. 1 schematically depicts a perspective view of an embodiment of a drill bit.

FIG. 1 schematically depicts a perspective view of an embodiment of a drill bit 1. The drill bit is a cylindrical drill bit, a Forstner (or "Forstner") bit or a Kunstbohrer. The drill bit comprises a shaft or shank 2 and a cylindrical head 3. The cylindrical head is arranged on one end of the shaft and both are centered to a longitudinal axis or rotational axis R. The other end of the shaft is couplable to e.g. a drill providing a rotational force to the drill bit in operation around said rotational axis in a bit working rotational direction D. The coupling of the shaft for coupling with the drill typically comprises a cross sectional hexagon shape.

The cylindrical head comprises two main cutting edges 4, 4' extending radially from the rotational axis at a side of the cylindrical a head opposite of the shaft. The side opposite the shaft is typically facing an object or a material to be cut during operation.

The cylindrical head further comprises two sets of circumferential cutting edges 6, 8, which define the circumference of the cylinder head. One end of each of the sets of circumferential cutting edges coincides with a respective radial end of the main cutting edges. The sets of circumferential cutting edges extend from their respective radial ends along the circumference towards the other main cutting edge. The ends opposite to the radial ends of the sets of circumferential cutting edges with their respective other main cutting edge may be left open. This open space typically extends towards the rotational axis and forms a chip space opening 5, 5' for removal of chips cut from the object that is cut with the drill bit.

The first set of circumferential cutting edges 6 comprises circumferential cutting edges 7, 7', 7", 7'''. The second set of circumferential cutting edges 8 comprises circumferential cutting edges 9, 9', 9", 9'''. These sets typically extend parallel and/or longitudinal to the rotational axis in a direction away from the shaft. In an embodiment, the drill bit may only comprise one set of circumferential cutting edges and/or only one main cutting edge.

The main cutting edges typically chip or cut away most of the material. The main cutting edges have the disadvantage that the material shatters and/or splinters due to the way the main cutting edge is arranged. The circumferential cutting edges typically are positioned and arranged for minimizing the shattering and/or splintering of the material, but have the disadvantage of allowing not as much material to be transported away from the area cut. In an embodiment, the circumferential cutting edges extend beyond the two main cutting edges in a direction away from the shaft. This allows the material to be cut with a circular pattern first by the circumferential cutting edges, where after the main cutting edges cut and/or chip away the inside. This has the effect that the hole in the material is having a clean side wall minimizing the shattering and/or splintering of the side wall of the hole in the material, while the hole can still be drilled with speed as the main cutting edges efficiently cut and/or chip away the larger part of the material.

The cylinder head may further comprise a space for positioning a mandrel or centering tip 10. The space is centered to the rotational axis and arranged to a side of the cylinder head opposite to the shaft. The mandrel functions during operation as creating a stable centering point.

Figure 2:
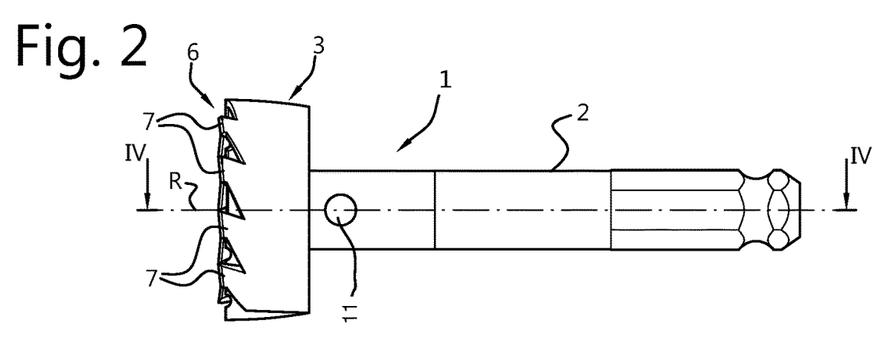
FIGS. 2 and 3 show opposite side views of the drill bit of FIG. 1.
Figure 3:
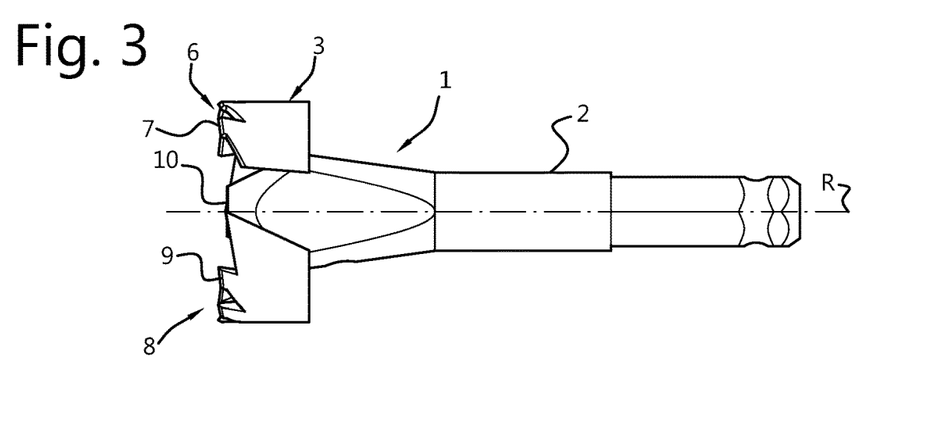
Figure 4:
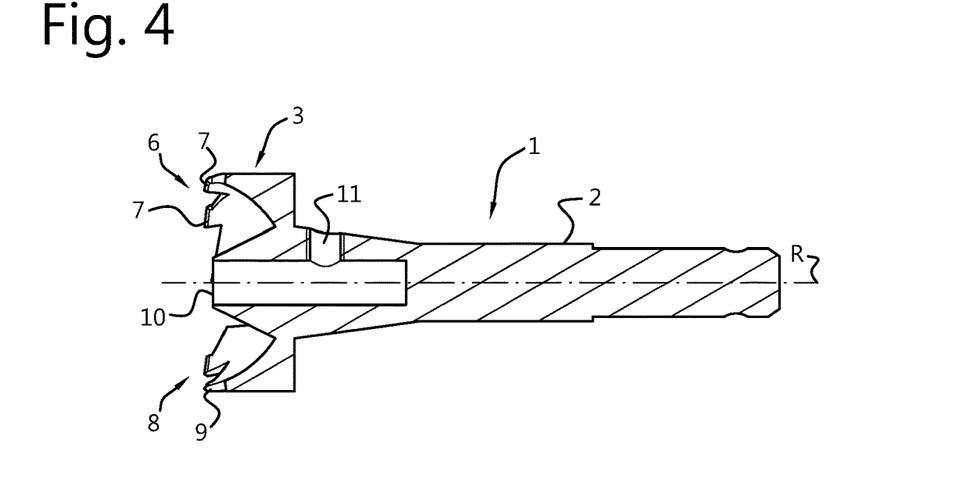
FIG. 4 shows the cross-sectional view as indicated in FIG. 2.
Figure 5:
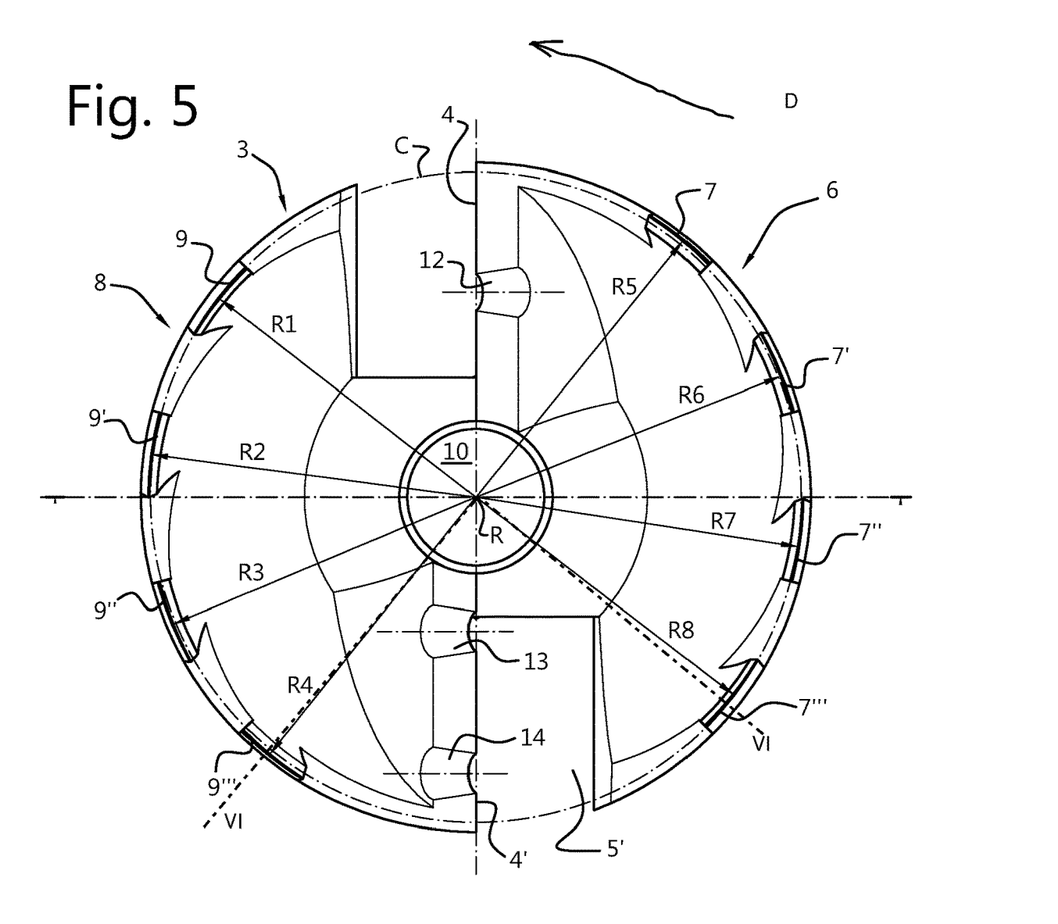
FIG. 5 shows a front view of the drill bit of FIG. 1.

FIGS. 2 and 3 show opposite side views of the drill bit of FIG. 1. Further, FIG. 2 shows a cross sectional reference plane IV for FIG. 4. The shaft of the drill bit may comprise a hole 11 for providing a fixing bolt for the mandrel positioned in the cylinder head via the space 10. FIG. 4 shows the cross-sectional view as indicated in FIG. 2. FIG. 5 shows a front view of the drill bit of FIG. 1. Further, FIG. 5 shows a cross sectional reference plane VI for FIG. 6.

The main cutting edges 4, 4' are intermitted by chip breaks 12, 13, 14. The chip breaker may be intermitted by a chip breaker opening, such as in the shape of a half cylinder. The chip breakers cause chips from the object that is cut to be broken in smaller parts and/or parts of smaller width. These smaller parts or chips will be easier to remove, such as via the chip space opening. The chip breakers are typically arranged at different distances from the rotational axis, such that after one rotation of the main cutting edges at least all the surface of the cut object within reach of the main cutting edges is chipped or cut. The chip breakers provide the advantage of decreasing the probability of clogging of the drill bit in operation. Furthermore, the chip breakers provide the advantage of increasing the speed of expelling material, due to that smaller parts need to be expelled from the drill bit. Thus, the overall speed of drilling of the drill bit is increased with the use of chip breakers.

The circumferential cutting edges 7, 7', 7", 7''' of the first set of circumferential cutting edges 6 are arranged at respectively radial distances R5, R6, R7, R8. The circumferential cutting edges 9, 9', 9", 9''' of the second set of circumferential cutting edges 8 are arranged at respectively radial distances R1, R2, R3, R4. Typically, at least one radial distance of the radial distances R5, R6, R7, R8 is different, preferably multiple radial distances are different, more preferably all radial distances are different. Typically, at least one radial distance of the radial distances R1, R2, R3, R4 is different, preferably multiple radial distances are different, more preferably all radial distances are different. In an embodiment, the radial distances R4 and R5, R3 and R6, R2 and R7, R1 and R8 are substantially equal, preferably the circumferential cutting edges are arranged substantially point symmetric relative to the rotational axis. In an alternative embodiment, the radial distances are arranged line symmetric, such as line VI or the line formed by main cutting edges. To reduce the vibrations, the drill bit according to the invention maintains mass balance or weight balance relative to the rotational axis as much as possible, while symmetry of cutting is avoided as much as possible. The avoidance of the symmetry of cutting is obtained by arranging the circumferential cutting edges at radial different distances according to the invention and/or by intermitting the main cutting edges with chip breakers according to the invention. A circle C helps to identify the change in radial distance for the circumferential cutting edges.

The respective radial distances of the two sets set of circumferential cutting edges R1, R2, R3, R4 and set R5, R6, R7, R8 may increase or decrease. Furthermore, the respective radial distances may change linear, quadratic, root square, logarithmic, exponential. Furthermore, the respective radial distances may diverge remittent or alternating from the radial distance, such as $R2=R1+a$, $R3=R1-b$, $R4=R1+c$; $(a,b,c) \in Q$ and $a<c$. In general, for a set of circumferential cutting edges the radial distances $Rn$ can be defined as $Rn=R1+(-1)^i \, xn$, with $xn \in \{\text{Real numbers}\}\pm$. FIG. 5 shows an embodiment wherein the respective sets of radial distances R1, R2, R3, R4 and R5, R6, R7, R8 decrease in the direction of rotation. The radial distance is typically in the range of 5 mm to 200 mm, preferably 10 mm to 100 mm, more preferably 20 mm to 50 mm. The change in radial distance is in the range of 0.01 mm to 5 mm, preferably 0.02 mm to 2 mm, more preferably 0.05 mm to 1 mm.

During operation, by arranging a trailing circumferential cutting edge at a radial distance different from a leading circumferential cutting edge it is prevented that the trailing circumferential cutting edge follows the groove in the object drilled in, cut or created by the leading circumferential cutting edge. It is an insight of the inventor that the trailing circumferential cutting edge, when not placed at a different radial distance, typically causes friction with the groove wall causing heat and vibration in the drill head and the object to be drilled or cut. The invention has thus the technical effect of reducing heat generation and/or vibration in the drill head and the object during operation. Furthermore, a larger part of the surface of the trailing circumferential cutting edge is used during drilling, having the effect of distributing wear over a larger surface, more evenly and/or increasing the speed with which material is cut away. The distribution of wear has the effect of prolonging the lifetime of the drill bit.

Furthermore, due to the reduced friction, the cylindrical drill bit will heat up less providing the advantage of less wear of the cylindrical drill bit. Furthermore, due to the reduced friction, it is less likely the material to be drilled is burned and/or heated to a temperature that the material oxidizes or deforms through melting.

Figure 6:
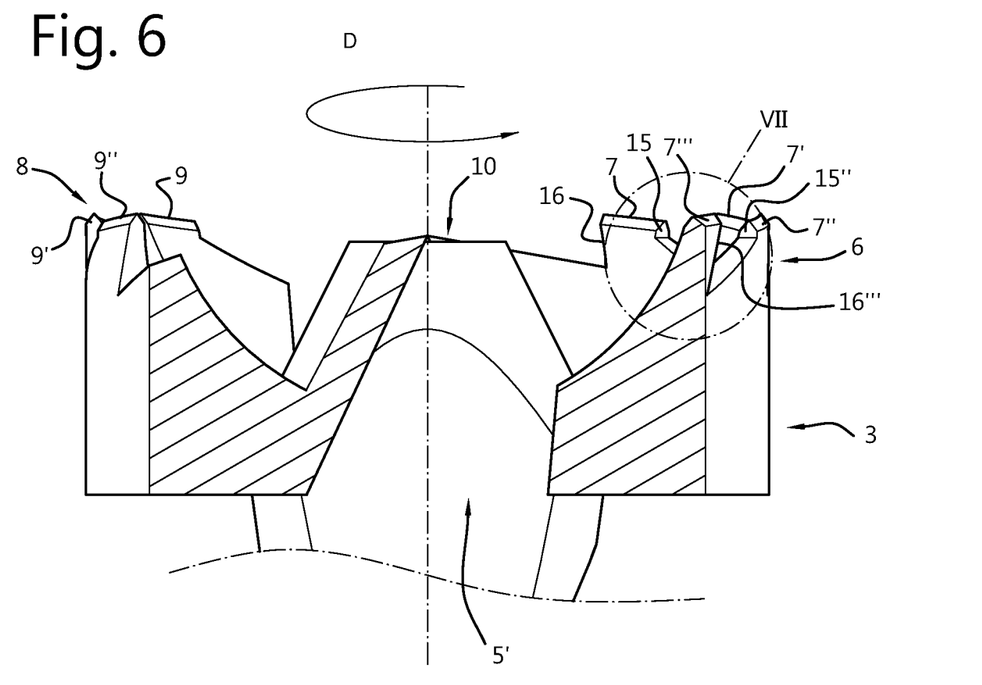
FIG. 6 shows the cross section as indicated in FIG. 5.

FIG. 6 shows the cross section as indicated in FIG. 5. FIG. 6 further shows a circle VII indicating the location of the detail shown in FIG. 7.

The circumferential cutting edges may be shaped like teeth 15. The circumferential cutting edges comprise similar features, such as the same features.

Only one circumferential cutting edge will be discussed in detail due to this similarity. The circumferential cutting edge 7''' comprises a leading cutting edge or longitudinal cutting edge 16''. The longitudinal cutting edge substantially extends from the base to the top of the circumferential cutting edge in a longitudinal direction relative to the rotational axis.

Figure 7:
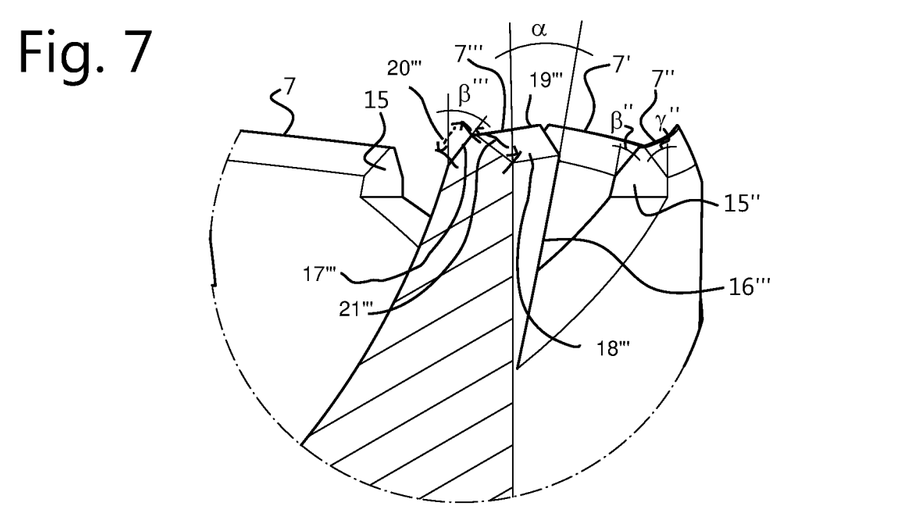
FIG. 7 shows the detail indicated in FIG. 6.

FIG. 7 shows the detail indicated in FIG. 6. The longitudinal cutting edge 16''' typically leans forward. In an alternative description, the longitudinal cutting edge is directed in the cutting direction rotational direction, such as in the operating direction, and provides longitudinal cutting edges, wherein in particular said longitudinal cutting edges are at an inclined angle a with respect to a line parallel to the rotational axis. The inclined angle a is between 3 and 25 degrees, preferably 4 and 20 degrees, more preferably 5 and 15 degrees, most preferably 6 and 10 degrees, with respect to the line parallel to the rotational axis or longitudinal axis.

The forward leaning longitudinal cutting edge substantially under the right angle a has the effect that the circumferential edge as a whole is forced deeper into the material during drilling. This allows the circumferential cutting edge to cut over a substantial longer length of the longitudinal cutting edge. By utilizing a substantial longer length of the longitudinal cutting edge, the wear is spread over this substantially longer length, thus prolonging the time the longitudinal cutting edge maintains sharpness, thus prolonging the lifetime of the cylindrical drill bit. Furthermore, this force also causes the main cutting edges to be dragged into the material, having the effect of dragging the main cutting edges faster trough the material to be removed by the main cutting edges. This effect also works the other way around, as the main cutting edges chip away material, the longitudinal cutting edge is forced deeper into the material, causing the circumferential cutting edge to cut faster through the material. The circumferential cutting edges comprise similar features, such as the same features, only one will be discussed in detail. The circumferential cutting edge 7''' comprises a top surface comprising an inner surface 17''' and an outer surface 18'.

The inner surface 17' is angled under an angle 0''' and has a width 20'''. The outer surface is angled under an angle y' and has a width 21'. Both with respect to a line parallel to the rotational axis. The inner width and the outer width together make up the width of the circumferential cutting edge. The angle 0 is in the range of 15° to 75°, preferably 25° to 65°, more preferably 35° to 55°. The angle y is in the range of 15° to 75°, preferably 25° to 65°, more preferably 35° to 55°. In a specific embodiment, the angles 0, y may be substantially the same.

The inner surface and the outer surface join each other forming a top cutting edge 19'''. The angle 0-$y$ defines the sharpness of the top cutting edge. The angle 0-$y$ is in the range of 45° to 135°, preferably 65° to 115°, more preferably 75° to 105°.

The top surface is shaped to cut through the material where upon the top surface is pressed. Typically, depending on the angles 0 and y and the widths of the inner and outer surface more material may be forced to either the inner side or the outer side of the circumferential cutting edge. In an embodiment, the angles 0 and y and the widths of the inner and outer surface more material vary depending on the radial distance of the circumferential cutting edge. In an embodiment, the angles 13 and y and the widths of the inner and outer surface of a subsequent circumferential cutting edge are configured to move more material to a side of the subsequent circumferential cutting edge, which has space, place or room created by the preceding circumferential cutting edge having a different radial distance compared to the subsequent circumferential cutting edge. Thus, if the preceding circumferential cutting edge has a larger radial distance compared to the subsequent circumferential cutting edge, more material of the subsequent circumferential cutting edge is expelled to the outer side of the circumferential cutting edge and vice versa.

Figure 8:
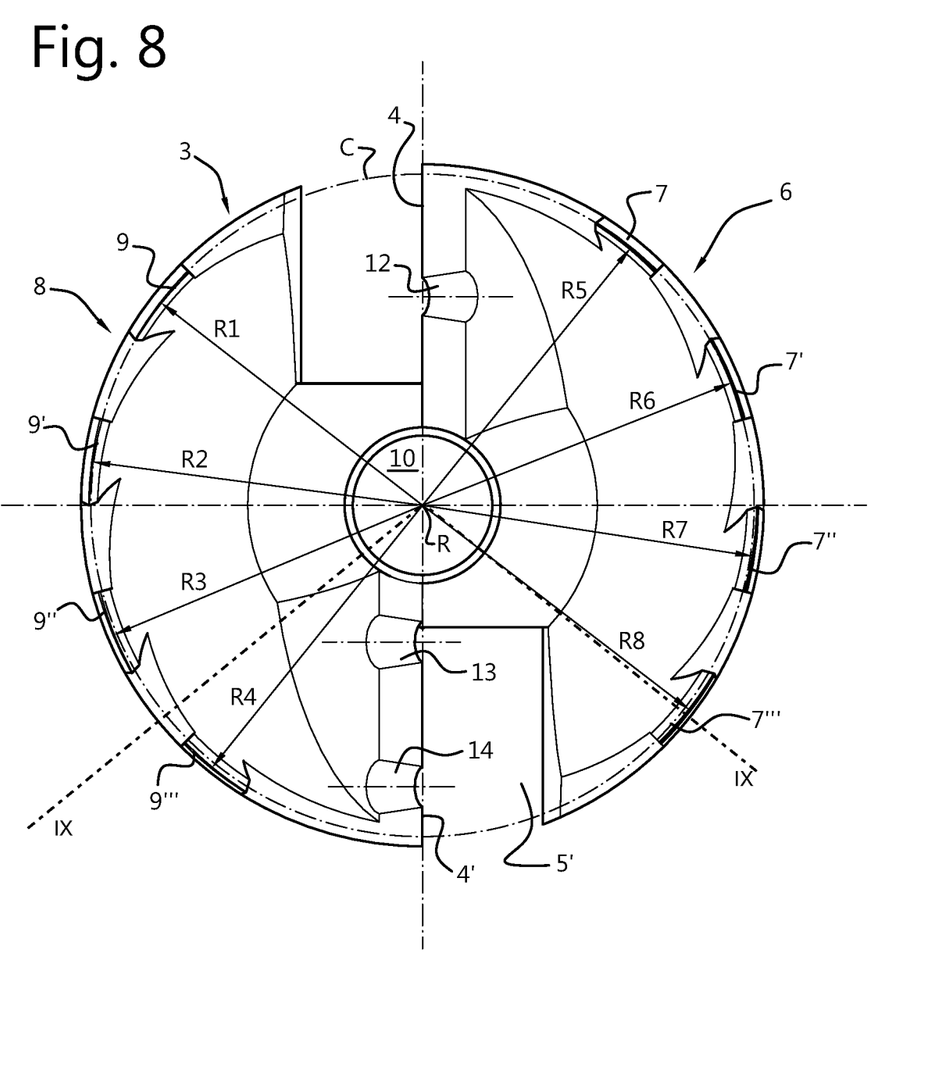
FIG. 8 shows a front view of an alternative embodiment.

FIG. 8 shows a front view of an alternative embodiment. While FIG. 5 shows an embodiment wherein the respective radial distances R1, R2, R3, R4 and R5, R6, R7, R8 decrease, FIG. 8 shows an embodiment wherein the respective radial distances R1, R2, R3, R4 and R5, R6, R7, R8 increase in a direction of rotation.

Figure 9:
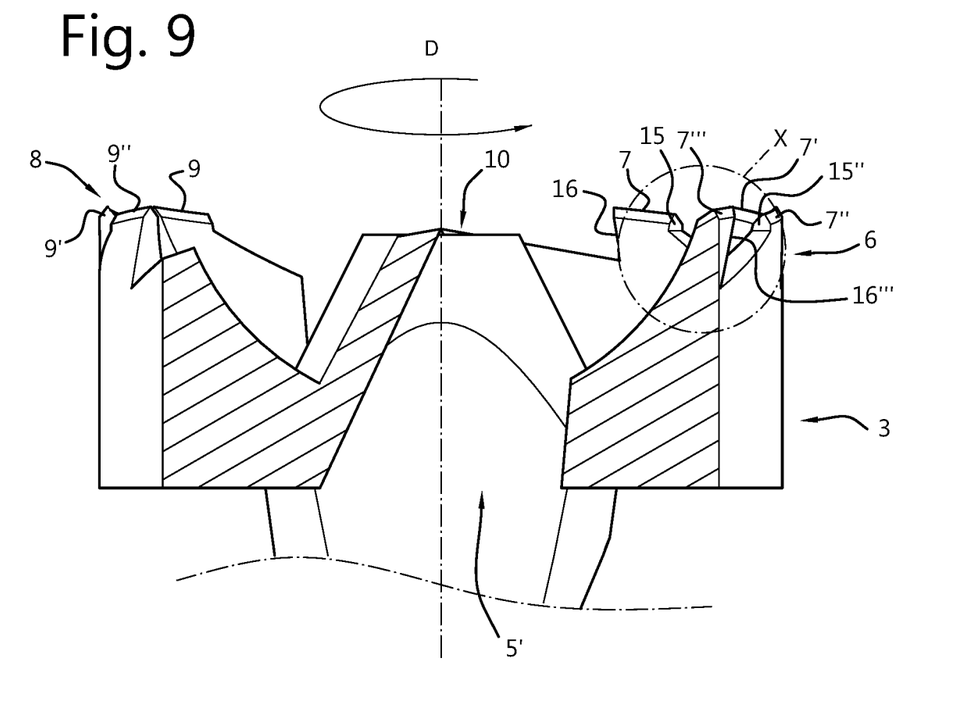
FIG. 9 shows the cross section as indicated in FIG. 8.

FIG. 9 shows the cross section as indicated in FIG. 8. The shown features are similar to the features described for FIG. 6.

Figure 10:
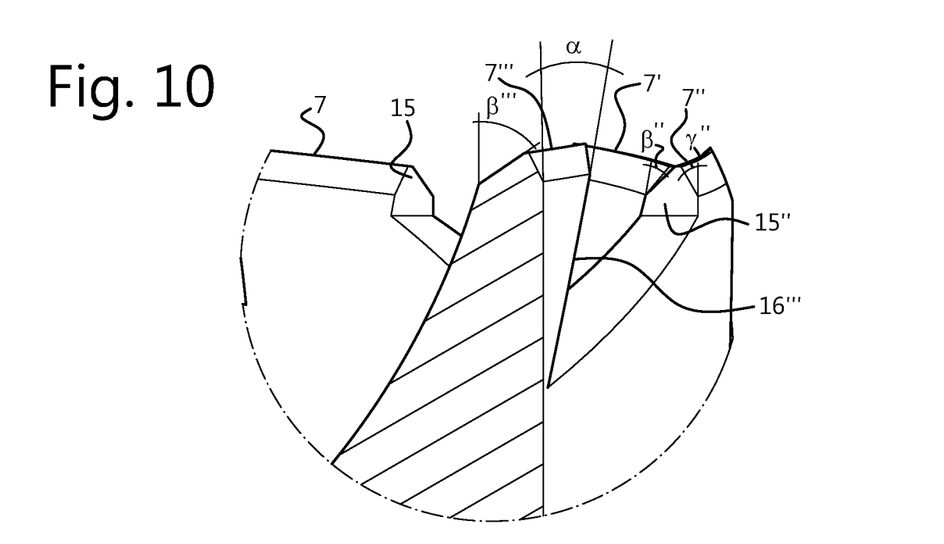
FIG. 10 shows the detail indicated in FIG. 9.

FIG. 10 shows the detail indicated in FIG. 9. The shown features are similar to the features described for FIG. 7.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

LIST OF REFERENCE NUMBERS

Cylindrical drill bit
shaft or shank
cylindrical head, straight circle cylindrical
4, 4' main cutting edge
5, 5' chip space opening
6 first set of circumferential cutting edges
7, 7', 7'', 7''' circumferential cutting edges of the first set of circumferential cutting edges
8 second set of circumferential cutting edges
9, 9', 9'', 9''' circumferential cutting edges of the second set of circumferential cutting edges
10 space for positioning a mandrel or centering tip
11 hole for providing a fixing bolt for the mandrel/centering tip
12, 13, 14 chip breakers for the main cutting edges
15 Tooth providing a circumferential cutting edge
16', 16''. 16''' longitudinal cutting edge
17', 17'', 17''' inner surface
18', 18'', 18''' outer surface
19, 19', 19'', 19''' top cutting edge
20', 20'', 20''' width inner surface
21', 21'', 21''' width outer surface
R1-R4 radial distances of the respective circumferential cutting edges of second set of circumferential cutting edges R5-R8 radial distances of the respective circumferential cutting edges of the first set of circumferential cutting edges
R rotational axis/longitudinal axis
C circle
D bit working rotational direction
a longitudinal cutting edge angle
f3''', f3'' circumferential cutting edge inner angle
y''', y'' circumferential cutting edge outer angle

The invention claimed is:

1. A cylindrical drill bit comprising:
a shank and a cylinder, both being centered to a longitudinal rotational axis,
said cylinder being arranged at one end of the shank and comprising
at least two radial main cutting edges, radially extending from the longitudinal rotational axis, and defining a bit working rotational direction,
a peripheral wall
forming said cylinder,
connecting radial ends of said at least two radial main cutting edges and chip space openings of a previous main cutting edge,
and comprising at least two sets of circumferential cutting edges positioned at a circumference centered to the longitudinal axis,
each set of circumferential cutting edges
being arranged between two subsequent main cutting edges and
comprising at least two circumferential cutting edges having mutually different radial distances from the rotational axis,
wherein said mutually different radial distances of said circumferential cutting edges are defined by setting an inner surface angled at a circumferential cutting edge inner angle on said peripheral wall and an outer surface angled at a circumferential cutting edge outer angle on said peripheral wall, the inner surface and the outer surface being angled with respect to a line parallel to the rotational axis,
wherein the inner surface defines an inner width and the outer surface defines an outer width,
wherein the inner width and the outer width together make up a circumferential-cutting-edge width of the circumferential cutting edge, and
wherein the inner surface and the outer surface join each other to form a top cutting edge.

2. The cylindrical drill bit of claim 1, wherein the mutually different radial distances increase or decrease for subsequent circumferential cutting edges.

3. The cylindrical drill bit of claim 1, wherein the at least two circumferential cutting edges each have a respective width and a respective radial distance and wherein a difference in the respective radial distances does not exceed any of the respective widths.

4. The cylindrical drill bit of claim 1, further comprising a space for positioning a central mandrel or centering tip from which space said main cutting edges extend.

5. The cylindrical drill bit of claim 1, wherein said mutually different radial distances of one set subsequentially increase in the bit working rotational direction and said radial distances of a subsequent set subsequentially decrease in the bit working rotational direction.

6. The cylindrical drill bit of claim 1, wherein the circumferential edge inner angle and the circumferential edge outer angle are congruent.

7. The cylindrical drill bit of claim 1, wherein said peripheral wall comprises wall segments forming teeth comprising the circumferential cutting edges.

8. The cylindrical drill bit of claim 7, wherein a side of the teeth directed to the bit working rotational direction provides a longitudinal cutting edge.

9. The cylindrical drill bit of claim 8, wherein the longitudinal cutting edge is directed in the bit working rotational direction at an inclined angle $\alpha$ with respect to a line parallel to the rotational axis.

10. The cylindrical drill bit of claim 9, wherein the inclined angle $\alpha$ is between 3 and 25 degrees.

11. The cylindrical drill bit of claim 9, wherein the inclined angle $\alpha$ is between 4 and 20 degrees.

12. The cylindrical drill bit of claim 9, wherein the inclined angle $\alpha$ is between 5 and 15 degrees.

13. The cylindrical drill bit of claim 9, wherein the inclined angle $\alpha$ is between 6 and 10 degrees.

14. The cylindrical drill bit according to claim 1, wherein the circumferential edge outer angle is in a range of 15° to 75°.

15. The cylindrical drill bit according to claim 1, wherein the circumferential edge outer angle is in a range of 25° to 65°.

16. The cylindrical drill bit according to claim 1, wherein the circumferential edge outer angle is in a range of 35° to 55°.

17. The cylindrical drill bit according to claim 1, wherein the circumferential edge inner angle is in a range of 15° to 75°.

18. The cylindrical drill bit according to claim 1, wherein the circumferential edge inner angle is in a range of 25° to 65°.

19. The cylindrical drill bit according to claim 1, wherein the circumferential edge inner angle is in a range of 35° to 55°.

20. The cylindrical drill bit according to claim 1, wherein the difference in the respective radial distances is in a range of 0.01 mm to 5 mm.

21. The cylindrical drill bit according to claim 1, wherein the difference in the respective radial distances is in a range of 0.02 to 2 mm.

22. The cylindrical drill bit according to claim 1, wherein the difference in the respective radial distances is in a range of 0.05 mm to 1 mm.

* * * * *